United States Patent
Deilami et al.

(10) Patent No.: US 10,156,173 B1
(45) Date of Patent: Dec. 18, 2018

(54) SYSTEMS AND METHODS FOR COMPENSATING A REDUCTANT DELIVERY SYSTEM IN AN AFTERTREATMENT SYSTEM OF AN INTERNAL COMBUSTION ENGINE

(71) Applicant: Cummins Emission Solutions Inc., Columbus, IN (US)

(72) Inventors: Masoud Ziabakhsh Deilami, Columbus, IN (US); Nassim Khaled, Decatur, GA (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 15/990,107

(22) Filed: May 25, 2018

(51) Int. Cl.
*F01N 3/20* (2006.01)
*B01D 53/94* (2006.01)

(52) U.S. Cl.
CPC ......... *F01N 3/208* (2013.01); *B01D 53/9431* (2013.01); *B01D 53/9495* (2013.01); *F01N 2900/1808* (2013.01); *F01N 2900/1812* (2013.01); *F01N 2900/1821* (2013.01)

(58) Field of Classification Search
None
See application file for complete search history.

(56) References Cited

U.S. PATENT DOCUMENTS 8,920,757 B1 * 12/2014 Chandrapati ...... B01D 53/9495
423/213.2

* cited by examiner

*Primary Examiner* — Walter D. Griffin
*Assistant Examiner* — Jelitza M Perez
(74) *Attorney, Agent, or Firm* — Foley & Lardner LLP

(57) ABSTRACT

A dosing module control system includes a central controller, a flow observer, and a switching doser controller. The central controller is configured to obtain a target flow rate and a target pressure. The flow observer is configured to determine a flow rate gain. The switching doser controller is configured to communicate with the central controller and the flow observer. The switching doser controller is configured to receive the target flow rate and the target pressure from the central controller, receive the flow rate gain from the flow observer, determine a compensated flow rate based on the target flow rate, the target pressure, and the flow rate gain, and determine at least one of an injector duty cycle associated with the determined compensated flow rate, or a pump frequency associated with the determined compensated flow rate. The pump is configured to communicate with the switching doser controller.

20 Claims, 5 Drawing Sheets

SYSTEMS AND METHODS FOR COMPENSATING A REDUCTANT DELIVERY SYSTEM IN AN AFTERTREATMENT SYSTEM OF AN INTERNAL COMBUSTION ENGINE

TECHNICAL FIELD

The present application relates generally to systems and methods for compensating for varying dimensions of an injector in a reductant delivery system in an aftertreatment system of an internal combustion engine.

BACKGROUND

For internal combustion engines, such as diesel engines, nitrogen oxide ($NO_x$) compounds may be emitted in the engine exhaust. To reduce $NO_x$ emissions, a reductant may be dosed into the exhaust by a dosing system. The dosing system includes an injector through which the reductant is dosed into the exhaust.

SUMMARY

In the above-described systems, the dimensions of the injector influence performance of the dosing system. Injectors are typically manufactured such that the dimensions of each injector are contained within a tolerance. As a result, each injector may have different dimensions. A dosing system may include a pressure sensor that measures the pressure of the reductant immediately upstream of the injector. Based on this pressure, the dosing system may, for example, provide more or less reductant to the injector (e.g., by changing a speed of a pump, by opening or closing a valve, etc.). However, the pressure sensor is tuned (e.g., calibrated, etc.) by a manufacturer (e.g., during a testing process, etc.) according to the dimensions of the injector in order to ensure proper operation of the pressure sensor. Tuning of the pressure sensor increases the costs associated with the dosing system. Accordingly, it is desirable to compensate for the dimensions of an injector without using a tuning process that tailors a sensor to the dimensions of the injector, thereby avoiding the added cost associated with the tuning process.

In one embodiment, a dosing module control system includes a central controller, a flow observer, and a switching doser controller. The central controller is configured to obtain a target flow rate and a target pressure. The flow observer is configured to determine a flow rate gain. The switching doser controller is configured to communicate with the central controller and the flow observer. The switching doser controller is configured to receive the target flow rate and the target pressure from the central controller, receive the flow rate gain from the flow observer, determine a compensated flow rate based on the target flow rate, the target pressure, and the flow rate gain, and determine at least one of an injector duty cycle associated with the determined compensated flow rate, or a pump frequency associated with the determined compensated flow rate. The pump is configured to communicate with the switching doser controller. The pump is configured to receive the at least one of the injector duty cycle or the pump frequency from the switching doser controller and to operate based on the at least one of the determined injector duty cycle or the determined pump frequency to provide reductant at the compensated flow rate.

In another embodiment, a dosing module control system includes a central controller, a pressure observer, a proportional-integral-derivative (PID) controller, and a pump. The central controller is configured to obtain a target flow rate and a target pressure. The pressure observer is configured to determine a pressure gain. The PID controller is configured to communicate with the central controller and the pressure observer. The PID controller is configured to receive the target flow rate and the target pressure from the central controller, receive the pressure gain from the pressure observer, determine a compensated flow rate based on the target flow rate, the target pressure, and the pressure gain, and determine at least one of an injector duty cycle associated with the compensated flow rate, or a pump frequency associated with the compensated flow rate. The pump is configured to communicate with the PID controller. The pump is configured to receive the at least one of the injector duty cycle or the pump frequency from the PID controller and to operate based on the at least one of the injector duty cycle or the pump frequency to provide reductant at the compensated flow rate.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
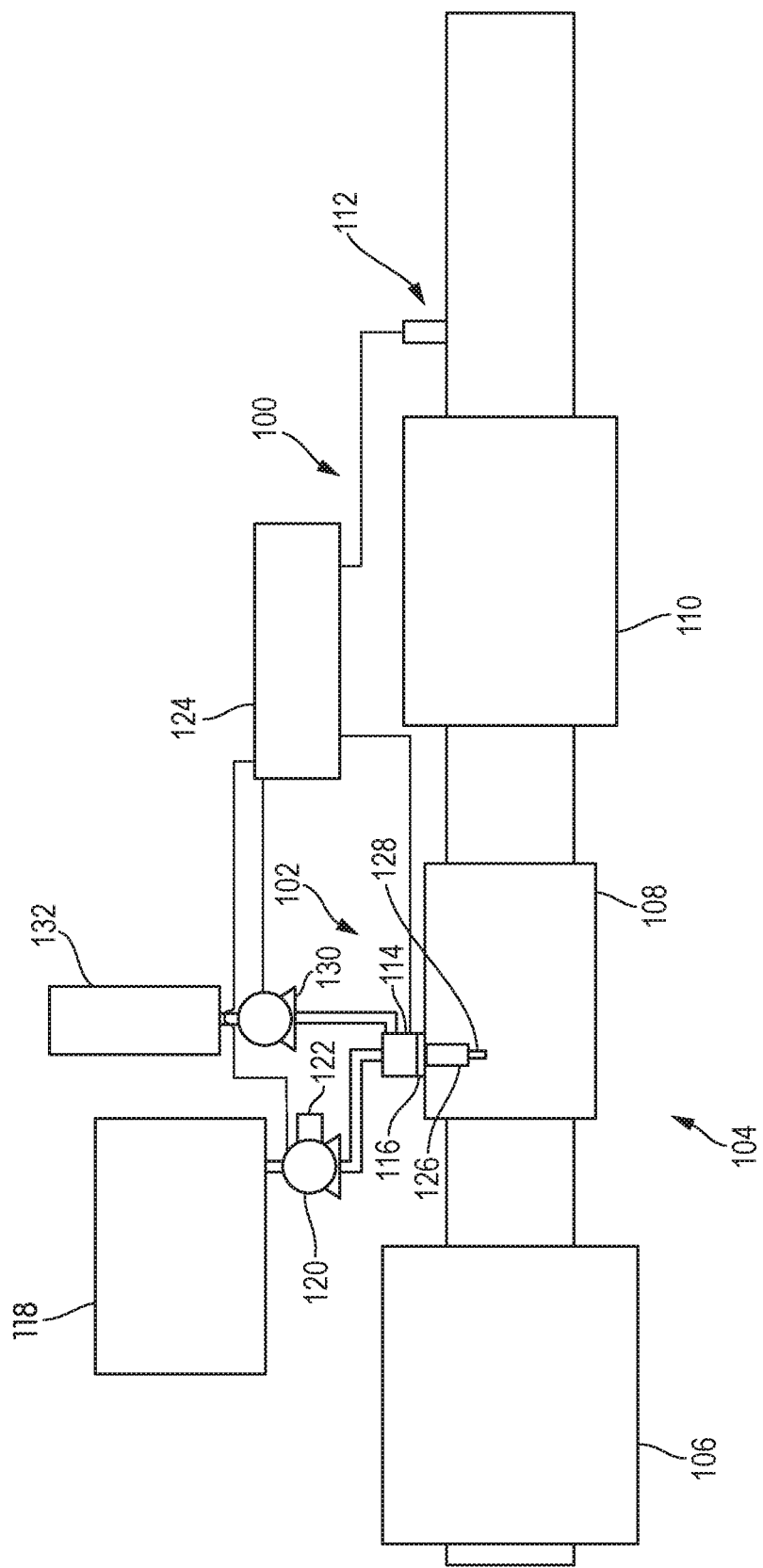
FIG. 1 is a block schematic diagram of an example aftertreatment system.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems compensating a reductant delivery system in an aftertreatment system of an internal combustion engine. The various concepts introduced above and discussed in greater detail below may be implemented in any of numerous ways, as the described concepts are not limited to any particular manner of implementation. Examples of specific implementations and applications are provided primarily for illustrative purposes.

I. Overview

Internal combustion engines (e.g., diesel internal combustion engines, etc.) produce exhaust gases that are often treated by a dosing module within an aftertreatment system. Dosing modules typically treat exhaust gases using a reductant. The reductant is typically provided from the dosing module into a dosing lance which distributes (e.g., doses, etc.) the reductant into an exhaust stream within an exhaust component.

Dosing modules include pumps which propel the reductant from a reductant tank into the dosing lance. Dosing modules may include a sensor that measures a pressure of the reductant within the pump, upstream of the pump, or downstream of the pump. Dosing modules may include a controller that receives the pressure from the sensor and is configured to control the pump according to the pressure. The sensors need to be tuned on an application by application basis, due to variations in injector dimensions, in order to optimize operation of the pump. This tuning requires a specialized process where workers perform various tuning operations. Accordingly, tuning represents a recognizable cost associated with the dosing modules.

Implementations described herein relate to a dosing module control systems that are configured to operate the pump in an optimal manner without a tuning process. The dosing module control system includes a controller that provides an injector duty cycle and/or a pump frequency to the pump to control operation of the pump. The controller is configured to determine the injector duty cycle and/or pump frequency continuously and dynamically change the injector duty cycle and/or pump frequency based on operation of the pump. The dosing module control system includes a flow observer and/or a pressure observer that monitors a pressure of the reductant associated with the pump and determines a pressure gain and/or a flow rate gain which is provided to the controller and utilized in determining the injector duty cycle and/or pump frequency. The dosing module control systems described herein are capable of optimizing operation of a pump on a continuous basis without regard for injector dimensions and without the need for a tuning process and the additional costs associated therewith.

II. Overview of Aftertreatment System

FIG. 1 depicts an aftertreatment system 100 having an example reductant delivery system 102 for an exhaust system 104. The aftertreatment system 100 includes a particulate filter (e.g., a diesel particulate filter (DPF) 106), the reductant delivery system 102, a decomposition chamber 108 (e.g., reactor, reactor pipe, etc.), a SCR catalyst 110, and a sensor 112.

The DPF 106 is configured to (e.g., structured to, able to, etc.) remove particulate matter, such as soot, from exhaust gas flowing in the exhaust system 104. The DPF 106 includes an inlet, where the exhaust gas is received, and an outlet, where the exhaust gas exits after having particulate matter substantially filtered from the exhaust gas and/or converting the particulate matter into carbon dioxide. In some implementations, the DPF 106 may be omitted.

The decomposition chamber 108 is configured to convert a reductant into ammonia. The reductant may be, for example, urea, diesel exhaust fluid (DEF), Adblue®, an urea water solution (UWS), an aqueous urea solution (e.g., AUS32, etc.), and other similar fluids. The decomposition chamber 108 includes a reductant delivery system 102 having a doser or dosing module 114 configured to dose the reductant into the decomposition chamber 108 (e.g., via an injector). In some implementations, the reductant is injected upstream of the SCR catalyst 110. The reductant droplets then undergo the processes of evaporation, thermolysis, and hydrolysis to form gaseous ammonia within the exhaust system 104. The decomposition chamber 108 includes an inlet in fluid communication with the DPF 106 to receive the exhaust gas containing $NO_x$ emissions and an outlet for the exhaust gas, $NO_x$ emissions, ammonia, and/or reductant to flow to the SCR catalyst 110.

The decomposition chamber 108 includes the dosing module 114 mounted to the decomposition chamber 108 such that the dosing module 114 may dose the reductant into the exhaust gases flowing in the exhaust system 104. The dosing module 114 may include an insulator 116 interposed between a portion of the dosing module 114 and the portion of the decomposition chamber 108 on which the dosing module 114 is mounted. The dosing module 114 is fluidly coupled to (e.g., fluidly configured to communicate with, etc.) a reductant source 118. The reductant source 118 may include multiple reductant sources 118. The reductant source 118 may be, for example, a diesel exhaust fluid tank containing Adblue®.

A supply unit or reductant pump 120 is used to pressurize the reductant from the reductant source 118 for delivery to the dosing module 114. In some embodiments, the reductant pump 120 is pressure controlled (e.g., controlled to obtain a target pressure, etc.). The reductant pump 120 includes a filter 122. The filter 122 filters (e.g., strains, etc.) the reductant prior to the reductant being provided to internal components (e.g., pistons, vanes, etc.) of the reductant pump 120. For example, the filter 122 may inhibit or prevent the transmission of solids (e.g., solidified reductant, contaminants, etc.) to the internal components of the reductant pump 120. In this way, the filter 122 may facilitate prolonged desirable operation of the reductant pump 120. In some embodiments, the reductant pump 120 is coupled to a chassis of a vehicle associated with the aftertreatment system 100.

The dosing module 114 and reductant pump 120 are also electrically or communicatively coupled to a controller 124. The controller 124 is configured to control the dosing module 114 to dose the reductant into the decomposition chamber 108. The controller 124 may also be configured to control the reductant pump 120. The controller 124 may include a microprocessor, an application-specific integrated circuit (ASIC), a field-programmable gate array (FPGA), etc., or combinations thereof. The controller 124 may include memory, which may include, but is not limited to, electronic, optical, magnetic, or any other storage or transmission device capable of providing a processor, ASIC, FPGA, etc. with program instructions. This memory, as well as the flow controller memory 212, the pressure controller memory 222, the pump memory 232, and the flow observer memory 240, may include a memory chip, Electrically Erasable Programmable Read-Only Memory (EEPROM), Erasable Programmable Read Only Memory (EPROM), flash memory, or any other suitable memory from which the associated controller can read instructions. The instructions may include code from any suitable programming language.

The SCR catalyst 110 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 110 includes an inlet in fluid communication with the decomposition chamber 108 from which exhaust gas and reductant are received and an outlet in fluid communication with an end of the exhaust system 104.

The exhaust system 104 may further include an oxidation catalyst (e.g., a diesel oxidation catalyst (DOC)) in fluid communication with the exhaust system 104 (e.g., downstream of the SCR catalyst 110 or upstream of the DPF 106) to oxidize hydrocarbons and carbon monoxide in the exhaust gas.

In some implementations, the DPF 106 may be positioned downstream of the decomposition chamber 108. For instance, the DPF 106 and the SCR catalyst 110 may be combined into a single unit. In some implementations, the dosing module 114 may instead be positioned downstream of a turbocharger or upstream of a turbocharger.

The sensor 112 may be coupled to the exhaust system 104 to detect a condition of the exhaust gas flowing through the exhaust system 104. In some implementations, the sensor 112 may have a portion disposed within the exhaust system 104; for example, a tip of the sensor 112 may extend into a portion of the exhaust system 104. In other implementations, the sensor 112 may receive exhaust gas through another conduit, such as one or more sample pipes extending from the exhaust system 104. While the sensor 112 is depicted as positioned downstream of the SCR catalyst 110, it should be understood that the sensor 112 may be positioned at any other position of the exhaust system 104, including upstream of the DPF 106, within the DPF 106, between the DPF 106 and the decomposition chamber 108, within the decomposition chamber 108, between the decomposition chamber 108 and the SCR catalyst 110, within the SCR catalyst 110, or downstream of the SCR catalyst 110. In addition, two or more sensors 112 may be utilized for detecting a condition of the exhaust gas, such as two, three, four, five, or six sensors 112 with each sensor 112 located at one of the aforementioned positions of the exhaust system 104.

The dosing module 114 includes a dosing lance assembly 126. The dosing lance assembly 126 includes a delivery conduit (e.g., delivery pipe, delivery hose, etc.). The delivery conduit is fluidly coupled to the reductant pump 120. The dosing lance assembly 126 includes at least one injector 128. The injector 128 is configured to dose the reductant into the exhaust gases (e.g., within the decomposition chamber 108, etc.). While not shown, it is understood that the dosing module 114 may include a plurality of injectors 128.

The reductant delivery system 102 also includes an air pump 130. The air pump 130 draws air from an air source 132 (e.g., air intake, etc.). Additionally, the air pump 130 provides the air to the dosing module 114 via a conduit. The dosing module 114 is configured to mix the air and the reductant into an air-reductant mixture. The dosing module 114 is further configured to provide the air-reductant mixture into the decomposition chamber 108.

Figure 2:
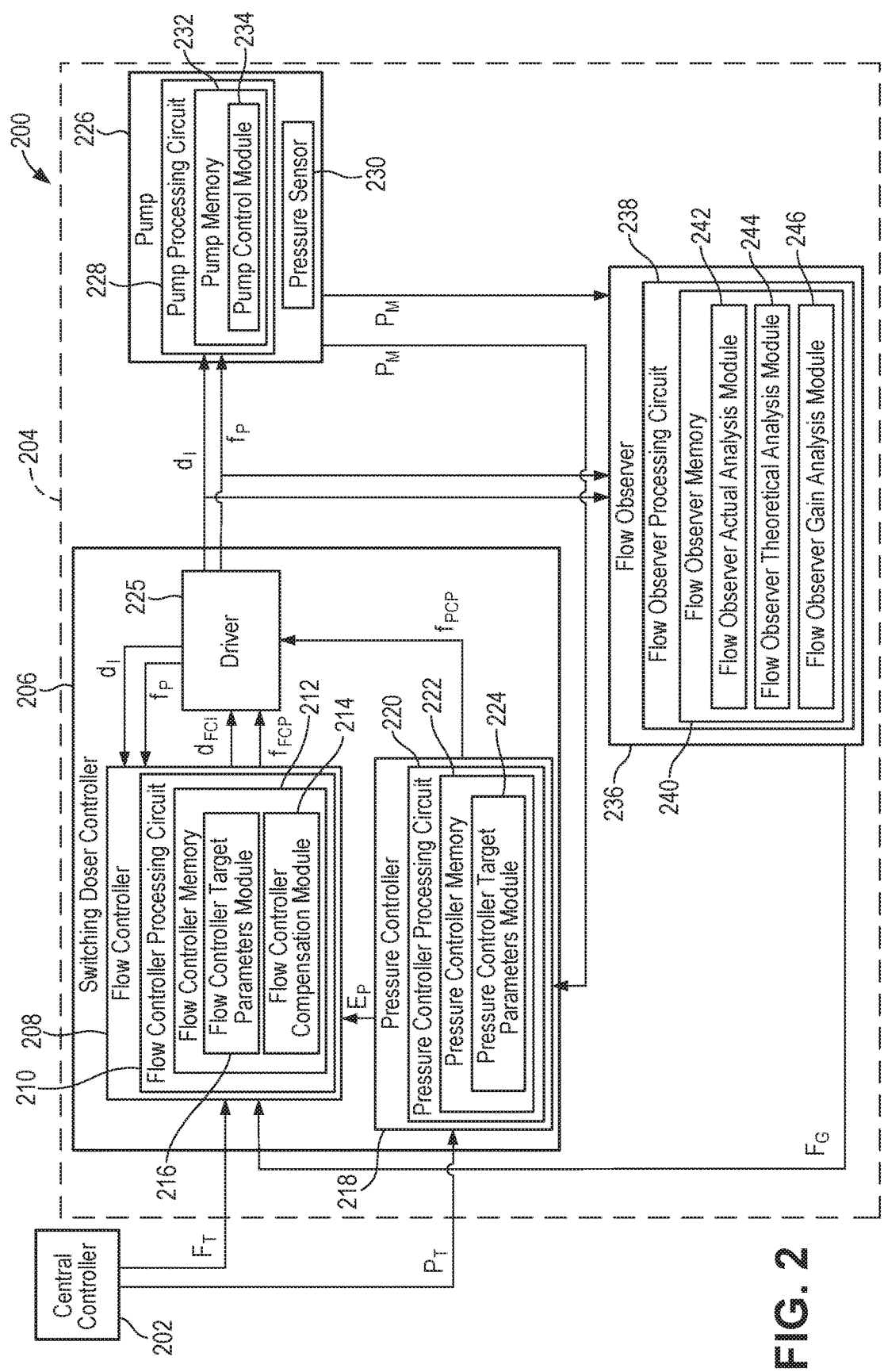
FIG. 2 is a block schematic diagram of an example dosing module control system for use in an aftertreatment system, such as the example aftertreatment system shown in FIG. 1.

III. Example Doser Control System with Switching Doser Controller and Flow Observer FIG. 2 illustrates an example dosing module control system 200. The dosing module control system 200 is implemented with at least one dosing module (e.g., the dosing module 114, etc.) in an aftertreatment system (e.g., the aftertreatment system 100, etc.) of an internal combustion engine system. For example, the dosing module control system 200 may be implemented with a plurality (e.g., two, three, four, etc.) of dosing modules.

The dosing module control system 200 includes a central controller 202. The central controller 202 may be, for example, an engine control unit (ECU), an aftertreatment controller, or other similar controller associated with an internal combustion engine and/or aftertreatment system. The dosing module control system 200 includes a doser compensation system 204. As will be explained in more detail herein, the doser compensation system 204 functions to receive a target flow rate from the central controller 202, analyze parameters associated with a pump of a doser, and implement a flow rate gain which facilitates optimized operation of the pump.

The doser compensation system 204 includes a switching doser controller 206. The switching doser controller 206 includes a flow controller 208. The flow controller 208 is configured to communicate with (e.g., is communicably coupled to, is electrically configured to communicate with, is electrically coupled to, etc.) the central controller 202. The flow controller 208 is configured to receive a target flow rate $F_T$ from the central controller 202. The target flow rate $F_T$ may be a mass flow rate, a volumetric flow rate, or other similar flow rates. As will be explained in more detail herein, the flow controller 208 is configured to selectively modify the target flow rate $F_T$ to obtain a compensated flow rate $F_C$. The compensated flow rate $F_C$ reflects a calculated variation in the target flow rate $F_T$ based on operation of a pump (e.g., the reductant pump 120, etc.). Once the compensated flow rate $F_C$ has been obtained, the switching doser controller 206 causes the pump (e.g., the reductant pump 120, etc.) to operate (e.g., to change a state of the pump, etc.) according to the compensated flow rate $F_C$ (e.g., to output reductant at the compensated flow rate $F_C$, etc.) thereby increasing the desirability of the pump.

The switching doser controller 206 is operable in a first state (e.g., disabled state, off state, deactivated state, etc.), where the compensated flow rate $F_C$ is equal to the target flow rate $F_T$, and a second state (e.g., enabled state, on state, activated state, etc.), where the compensated flow rate $F_C$ is a function of the target flow rate $F_T$ and an average flow rate gain $F_{GAvg}$, which is a function of a flow rate gain $F_G$. As will be explained in more detail herein, the flow rate gain $F_G$ is determined based on operation of a pump (e.g., the reductant pump 120, etc.) and the average flow rate gain $F_{GAvg}$ is determined using discrete time integration. In one example, the switching doser controller 206 may be in the first state such that the compensated flow rate $F_C$ is equal to the target flow rate $F_T$ upon start-up of an internal combustion engine (e.g., at the first time step, etc.) having the dosing module control system 200.

The flow controller 208 includes a flow controller processing circuit 210 which further includes a flow controller memory 212. The flow controller memory 212 includes a flow controller compensation module 214 and a flow controller target parameters module 216. The flow controller compensation module 214 is configured to control the state of the switching doser controller 206 (e.g., modulate the switching doser controller 206 between the first state and the second state, etc.). Once the flow controller 208 determines the compensated flow rate $F_C$, the flow controller 208 utilizes the compensated flow rate $F_C$ to produce a flow controller injector duty cycle $d_{FCI}$ and a flow controller pump frequency $f_{FCP}$. The flow controller injector duty cycle $d_{FCI}$ is a duty cycle determined by the flow controller 208 for at least one injector (e.g., the injector 128, etc.) of a reductant delivery system (e.g., the reductant delivery system 102, etc.) having the dosing module control system 200. The flow controller pump frequency $f_{FCP}$ is a pump frequency determined from the flow controller 208 for a pump (e.g., the reductant pump 120, etc.) of the dosing module control system 200.

The switching doser controller 206 also includes a pressure controller 218. The pressure controller 218 is configured to receive a target pressure $P_T$ from the central controller 202 and to receive a measured pressure $P_M$. The target pressure $P_T$ is a target (e.g., desired, theoretical, etc.) pressure associated with a pump (e.g., the reductant pump 120, etc.) of the dosing module control system 200. The measured pressure $P_M$ is a measured (e.g., actual, etc.) pressure associated with a pump (e.g., the reductant pump 120, etc.) of the dosing module control system 200. The measured pressure $P_M$ may be an average of a set of pressures (e.g., an average of a set of pressures obtained over an interval of time, an average of a set of a number of pressure readings, etc.). The pressure controller 218 includes a pressure controller processing circuit 220 which further includes a pressure controller memory 222. The pressure controller memory 222 includes a pressure controller target parameters module 224. The pressure controller 218 utilizes the target pressure $P_T$ to produce a pressure controller pump frequency $f_{PCP}$. The pressure controller pump frequency $f_{PCP}$ is a frequency associated with a pump (e.g., the reductant pump 120, etc.) of the dosing module control system 200 as measured by the pressure controller 218.

The doser compensation system 204 also includes a driver 225. The driver 225 is configured to receive the flow controller injector duty cycle $d_{FCI}$ and the flow controller pump frequency $f_{FCP}$ from the flow controller 208, receive the pressure controller pump frequency $f_{PCP}$ from the pressure controller 218, and produce an injector duty cycle $d_I$ and a pump frequency G. The injector duty cycle $d_I$ is a percentage of time over a target duration in which the injector (e.g., the injector 128, etc.) is activated and dosing the reductant (e.g., into the exhaust gases, etc.). The pump frequency $f_P$ is a frequency at which a pump (e.g., the reductant pump 120, etc.) is to operate (e.g., a number of strokes of a cylinder within the pump per second, a number of revolutions of an impeller within the pump per second, etc.).

The doser compensation system 204 also includes a pump 226 (e.g., positive displacement pump, centrifugal pump, etc.). In an example embodiment, the pump 226 may be a piston pump P1300 from Thomas Magnete GmbH. The pump 226 is part of the dosing module (e.g., the dosing module 114, etc.) that the dosing module control system 200 is implemented with. The pump 226 controls the flow of reductant from the dosing module and therefore controls the amount of reductant that is dosed into an exhaust component.

The pump 226 includes a pump processing circuit 228 and a pressure sensor 230. The pressure sensor 230 is configured to measure the pressure of the reductant provided by the pump 226 (e.g., at an outlet of the pump 226, etc.) and/or the pressure of the reductant provided to the pump 226 (e.g., at an inlet of the pump 226, etc.). The pump processing circuit 228 includes a pump memory 232 which further includes a pump control module 234. The pump 226 is configured to receive the injector duty cycle $d_I$ and pump frequency $f_P$ from the driver 225 and alter operation of the pump 226 accordingly. For example, as the pump frequency $f_P$ increases, the pump 226 may cause an impeller of the pump 226 to spin faster. The pump 226 is configured to provide the measured pressure $P_M$. As the injector duty cycle $d_I$ and pump frequency $f_P$ change, the measured pressure $P_M$ correspondingly changes.

The doser compensation system 204 also includes a flow observer 236. The flow observer includes a flow observer processing circuit 238 which further includes a flow observer memory 240. The flow observer memory 240 includes a flow observer actual analysis module 242, a flow observer theoretical analysis module 244, and a flow observer gain analysis module 246. The flow observer 236 is configured to receive the injector duty cycle $d_I$ and pump frequency $f_P$ from the driver 225, receive the measured pressure $P_M$, and produce the flow rate gain $F_G$.

Figure 3:
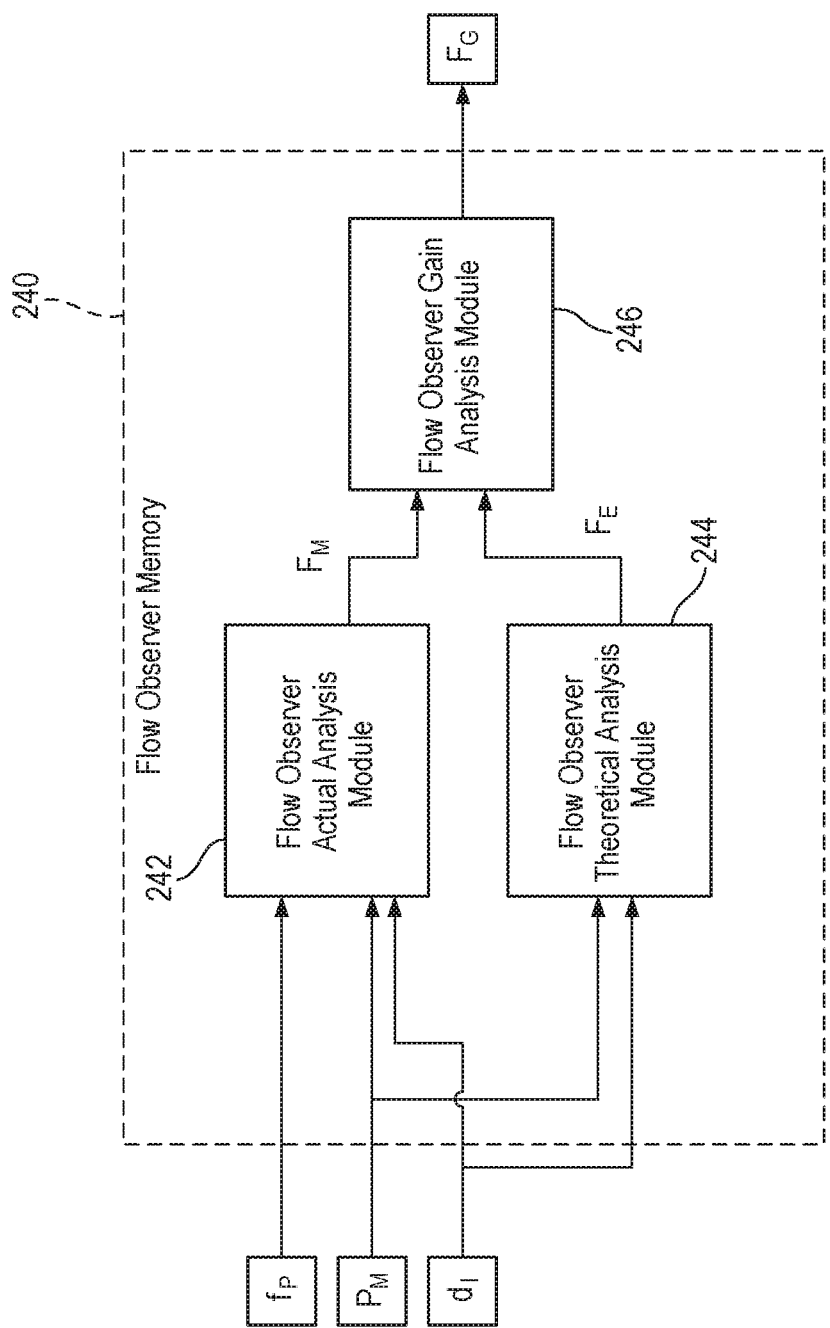
FIG. 3 is a detailed view of a portion of the example dosing module control system shown in FIG. 2.

FIG. 3 illustrates the flow observer memory 240 in greater detail. The flow observer actual analysis module 242 is configured to receive the pump frequency $f_P$, the measured pressure $P_M$, and the injector duty cycle $d_I$. The flow observer actual analysis module 242 is configured to produce a measured flow $F_M$. The measured flow $F_M$ is a measured flow rate of reductant through and/or into the pump 226. The flow observer theoretical analysis module 244 is configured to receive the measured pressure $P_M$ and the injector duty cycle $d_I$ and produce an estimated flow $F_E$. The estimated flow $F_E$ is an estimated (e.g., calculated, determined, etc.) flow rate of reductant through and/or into the pump 226. The flow observer gain analysis module 246 is configured to receive the measured flow $F_M$ and the estimated flow $F_E$ and produce the flow rate gain $F_G$. The flow rate gain $F_G$ is a dimensionless factor that represents a comparison between the measured flow $F_M$ and the estimated flow $F_E$.

After receiving the pump frequency $f_P$, the flow observer actual analysis module 242 is configured to correlate the pump frequency $f_P$ to a correlated frequency flow $C_{FF}$. For example, the flow observer actual analysis module 242 may utilize a lookup table or datasheet provided by a manufacturer of the pump 226 to correlate the pump frequency G to the correlated frequency flow $C_{FF}$. The correlated frequency flow $C_{FF}$ is used to compute the measured flow $F_M$. The correlation of the pump frequency $f_P$ to the correlated frequency flow $C_{FF}$ is also based on the measured pressure $P_M$. In an example embodiment, the correlation of the pump frequency $f_P$ to the correlated frequency flow $C_{FF}$ may be given by $$C_{FF} = \frac{0.325 \, f_P}{3600} \tag{1}$$

where the measured pressure $P_M$ is 0 bar and $$C_{FF} = \frac{0.2875 \, f_P}{3600} \tag{2}$$

where the measured pressure $P_M$ is 8 bar. Accordingly, the correlation of the pump frequency $f_P$ to a correlated frequency flow $C_{FF}$ may be given by $$C_{FF} = \frac{(0.325 - 0.0046875 \, P_M) f_P}{3600} \tag{3}$$

After receiving the measured pressure $P_M$, the flow observer actual analysis module 242 is configured to correlate the measured pressure $P_M$ to a correlated pressure flow $C_{PF}$. For example, the flow observer actual analysis module 242 may utilize a lookup table or datasheet provided by a manufacturer of the pump 226 to correlate the measured pressure $P_M$ to the correlated pressure flow $C_{PF}$. The correlated pressure flow $C_{PF}$ is used to compute the measured flow $F_M$. In an example embodiment, the correlation of the measured pressure $P_M$ to the correlated pressure flow $C_{PF}$ may be given by $$C_{PF} = \frac{7.6}{3600} \left[\frac{L}{s}\right] \tag{4}$$

where the measured pressure $P_M$ is 0 bar and $$C_{PF} = \frac{6.9}{3600} \left[\frac{L}{s}\right] \tag{5}$$

where the measured pressure $P_M$ is 8 bar. Accordingly, the correlation of the measured pressure $P_M$ to a correlated pressure flow $C_{PF}$ may be given by $$C_{PF} = (0.0125 \, P_M + 1) * \frac{6.9}{3600} \tag{6}$$

The flow observer actual analysis module 242 is also configured to correlate the injector duty cycle $d_I$ to a correlated injector factor $C_{IF}$. The correlated injector factor $C_{IF}$ is determined by $$C_{IF} = \frac{d_I}{100} \tag{7}$$

In an example embodiment, the measured flow $F_M$ is then determined by $$F_M = \left(\frac{C_{FF} + C_{PF}}{2}\right) C_{IF} \tag{8}$$

although other similar functions of the correlated frequency flow $C_{FF}$, the correlated pressure flow $C_{PF}$, and correlated injector factor $C_{IF}$ may be utilized to determine the measured flow $F_M$. In these ways, the flow observer actual analysis module 242 functions as a tuning linear pump flow model.

After receiving the injector duty cycle $d_I$ and the measured pressure $P_M$, the flow observer theoretical analysis module 244 is configured to utilize the injector duty cycle $d_I$ and the measured pressure $P_M$ to compute the estimated flow $F_E$. The flow observer theoretical analysis module 244 utilizes a look-up table or datasheet provided by a manufacturer of the pump 226 to correlate the injector duty cycle $d_I$ and the measured pressure $P_M$ to the estimated flow $F_E$. The flow observer theoretical analysis module 244 communicates with the pump 226 to cause the pump 226 to operate at a target injector duty cycle $d_{TT1}$, thereby causing the pump 226 to obtain a target measured pressure $P_{TM}$. The flow observer theoretical analysis module 244 then computes the estimated flow $F_{E1}$ for the target injector duty cycle $d_{TT}$. The flow observer theoretical analysis module 244 then computes the estimated flow $F_{E2}$ for a different target injector duty cycle $d_{TT2}$. After a target number (e.g., two, three, four, etc.) of computed estimated flows $F_{E1}$, $F_{E2}$ have been computed, the estimated flow $F_E$ is computed by taking the average of the computed estimated flows $F_{E1}$, $F_{E2}$. In an example embodiment, the flow observer theoretical analysis module 244 controls the injector duty cycle $d_I$ using a proportional-integral-derivative (PID) controller. In these ways, the flow observer actual analysis module 242 functions as a tuning pressure to flow model.

The flow observer gain analysis module 246 is configured to compute the flow rate gain $F_G$ based on the measured flow $F_M$ and the estimated flow $F_E$. The measured flow $F_M$ is first passed through a saturation filter which imposes an upper limit and lower limit on the measured flow $F_M$. In other words, if the measured flow $F_M$ is above the upper limit the measured flow $F_M$ will be set to the upper limit by the saturation filter and the measured flow $F_M$ will be set to the lower limit by the saturation filter if the measured flow $F_M$ is below the lower limit. An initial flow rate gain $F_{IG}$ is then computed by $$F_{IG} = \frac{F_E}{F_M} \tag{9}$$

The initial flow rate gain $F_{IG}$ is then passed through a time constant filter (e.g., high pass filter, low pass filter, etc.) to produce the flow rate gain $F_G$. In an example embodiment, this time constant filter is a first order two second filter that executes at 10 Hertz (Hz) (e.g., when the pump frequency $f_P$ is 10 Hz, etc.). The time constant filter may be $$F_G = \frac{num(F_{IG})}{1 - 0.995 F_{IG}^{-1}} \tag{10}$$

where $num(F_{IG})$ is the real component (e.g., as opposed to any imaginary component, etc.) of the initial flow rate gain $F_{IG}$. The flow rate gain $F_G$ is then passed through a saturation filter which imposes an upper limit and lower limit on the flow rate gain $F_G$. In other words, if the flow rate gain $F_G$ is above the upper limit the flow rate gain $F_G$ will be set to the upper limit by the saturation filter and the flow rate gain $F_G$ will be set to the lower limit by the saturation filter if the flow rate gain $F_G$ is below the lower limit. In an example embodiment, the upper limit is 1.4 and the lower limit is 0.6. In various embodiments, the average of the upper limit and the lower limit does not equal 1.

Once the flow rate gain $F_G$ has been computed by the flow observer gain analysis module 246, the flow rate gain $F_G$ is provided to the flow controller 208, and the process of determining the compensated flow rate $F_C$ beings again. This operation may be run in a continuous loop such that the pump 226 continues to operate desirably. In this way, the dosing module control system 200 may optimize operation of the pump 226 according to dimensions of a specific injector associated with the dosing module control system 200. Additionally, the dosing module control system 200 may be utilized to perform on-board or remote diagnostics. For example, the doser compensation system 204 may communicate with an external system (e.g., a laptop, a computer, a mobile phone, etc.) and transmit, for example, the measured pressure $P_M$, the flow rate gain $F_G$, the injector duty cycle $d_I$, the pump frequency $f_P$, and the pressure error $E_P$ to the external system.

The central controller 202, the flow controller processing circuit 210, the pressure controller processing circuit 220, the driver 225, the pump processing circuit 228, and/or the flow observer processing circuit 238 may include a microprocessor, an ASIC, a FPGA, etc., or combinations thereof. The central controller 202 and/or the driver 225 may include memory, which may include, but is not limited to, electronic, optical, magnetic, or any other storage or transmission device capable of providing a processor, ASIC, FPGA, etc. with program instructions. The memory may include a memory chip, EEPROM, EPROM, flash memory, or any other suitable memory from which the associated controller can read instructions. The instructions may include code from any suitable programming language.

The doser compensation system 204 may be located separate from the central controller 202. For example, the central controller 202 may be located proximate a front end of a vehicle (e.g., in an engine bay, in a cab, etc.) and the doser compensation system 204 may be located proximate a rear end of a vehicle (e.g., in a cargo bay, in a frame compartment, etc.).

The driver 225 is configured to provide the injector duty cycle $d_I$ and the pump frequency $f_P$ to the flow controller 208. Additionally, the pressure controller 218 is configured to compare the target pressure $P_T$ and the measured pressure $P_M$ to determine a pressure error $E_P$. The pressure controller 218 is also configured to provide the pressure error $E_P$ to the flow controller 208.

The switching doser controller 206 is configured to switch between the first state, where the compensated flow rate $F_C$ is equal to the target flow rate $F_T$, and the second state, where the compensated flow rate $F_C$ is a function of the target flow rate $F_T$ and an average flow rate gain $F_{GAvg}$, which is a function of a flow rate gain $F_G$. In an example embodiment, the switching doser controller 206 is configured to operate in the first state when an internal combustion engine associated with the dosing module control system 200 is not powered and when the internal combustion engine is operating at conditions other than steady-state (e.g., warm up, cool down, etc.). In this embodiment, the switching doser controller 206 is configured to operate in the second state when the internal combustion engine is operating at steady-state and has been operating at steady state for an amount of time t greater than a target amount of time $t_{Target}$ (e.g., 20 seconds, 20 minutes, etc.). In this way, the target amount of time $t_{Target}$ functions like a threshold. In an example embodiment, the target amount of time $t_{Target}$ is 20 seconds.

The switching doser controller 206 may determine if the internal combustion engine is operating at steady-state by comparing a parameter to maximum and minimum values for that parameter, the maximum and minimum values defining a range of the parameter associated with operation of the internal combustion engine at steady state. In various embodiments, these parameters are the injector duty cycle $d_I$, the pump frequency $f_P$, and the pressure error $E_P$. Accordingly, the switching doser controller 206 may utilize any combination of the comparisons $$d_{IMin} < d_I < d_{IMax} \quad (11)$$

$$f_{PMin} < f_P < f_{PMax} \quad (12)$$

$$E_{PMin} < E_P < E_{PMax} \quad (13)$$

to determine if the internal combustion engine is operating at steady state. Specifically, the switching doser controller 206 may determine that the internal combustion engine is operating at steady state if: the injector duty cycle $d_I$ is greater than a minimum injector duty cycle $d_{IMin}$ and less than a maximum injector duty cycle $d_{IMax}$; the pump frequency $f_P$ is greater than a minimum pump frequency $f_{PMin}$ and less than a maximum pump frequency $f_{PMax}$; and/or the pressure error $E_P$ is greater than a minimum pressure error $E_{PMin}$ and less than a maximum pressure error $E_{PMax}$. The switching doser controller 206 may perform these comparisons continuously (e.g., at each time step, etc.). For example, the switching doser controller 206 may perform these comparisons continuously while the internal combustion engine is operational and not perform these comparisons while the internal combustion engine is not operational.

As previously mentioned, the compensated flow rate $F_C$ is a function of the average flow rate gain $F_{GAvg}$. The average flow rate gain $F_{GAvg}$ is determined continuously once the switching doser controller 206 has been in the second state for an amount of time t greater than the target amount of time $t_{Target}$. For example, so long as the injector duty cycle $d_I$ is greater than the minimum injector duty cycle $d_{IMin}$ and less than the maximum injector duty cycle $d_{IMax}$, and the amount of time t is greater than the target amount of time $t_{Target}$, the average flow rate gain $F_{GAvg}$ may be determined. Once the switching doser controller 206 switches from the second state back to the first state, the amount of time t is reset back to 0 but will restart (e.g., count from 0 upwards) once the switching doser controller 206 is in the second state again. In this way, the amount of time t may be thought of as recording an amount of time that the switching doser controller 206 has been in the second state at the present instance of the switching doser controller 206 being in the second state (e.g., rather than a total amount of time that the switching doser controller 206 has been in the second state without regard to whether or not the switching doser controller 206 has been in the first state since initially entering the second state, etc.).

The amount of time t is a discrete output from a discrete time integration, using a unit delay, of an actual amount of time $t_{Actual}$ that the switching doser controller 206 has been in the second state. Like the amount of time t, the actual amount of time $t_{Actual}$ is also reset back to 0 when the switching doser controller 206 enters the first state, but will restart once the switching doser controller 206 enters the second state. The unit delay is equal to the amount of time t at one time step prior (e.g., n−1, etc.) to the time step (e.g., n, etc.) at which the actual amount of time $t_{Actual}$ is determined, where the amount of time t is greater than the target amount of time $t_{Target}$.

To determine the average flow rate gain $F_{GAvg}$, the flow rate gain $F_G$ is first passed through a discrete time integration using the unit delay. The flow rate gain $F_G$ is then divided by the amount of time t, without regard as to the target amount of time $t_{Target}$, to determine the average flow rate gain $F_{GAvg}$. However, the switching doser controller 206 only utilizes the average flow rate gain $F_{GAvg}$ in computing the compensated flow rate $F_C$ if the amount of time t is greater than the target amount of time $t_{Target}$.

IV. Example Doser Control System with PID Controller and Pressure Observer

Figure 4:
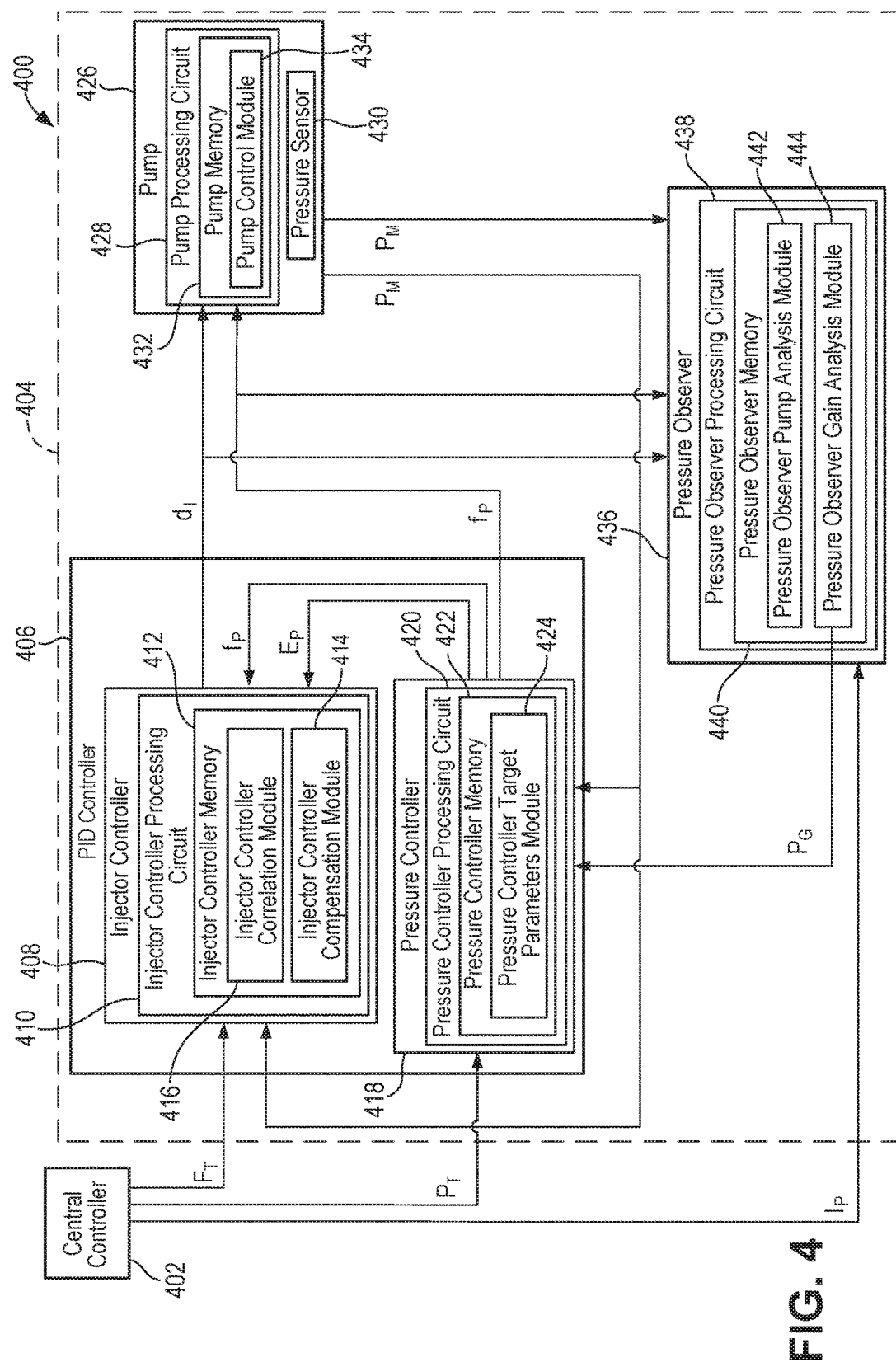
FIG. 4 is a block schematic diagram of an example dosing module control system for use in an aftertreatment system, such as the example aftertreatment system shown in FIG. 1.

FIG. 4 illustrates an example dosing module control system 400. The dosing module control system 400 is implemented with at least one dosing module (e.g., the dosing module 114, etc.) in an aftertreatment system (e.g., the aftertreatment system 100, etc.) of an internal combustion engine system. For example, the dosing module control system 400 may be implemented with a plurality (e.g., two, three, four, etc.) of dosing modules.

The dosing module control system 400 includes a central controller 402. The central controller 402 is similar to the central controller 202 previously described. The dosing module control system 400 includes a doser compensation system 404. As will be explained in more detail herein, the doser compensation system 404 functions to receive a target flow rate from the central controller 402, analyze parameters associated with a pump of a doser, and form a compensated flow rate which facilitates optimized operation of the pump.

The doser compensation system 404 includes a PID controller 406. The PID controller 406 includes an injector controller 408. The injector controller 408 is configured to communicate with (e.g., is communicably coupled to, is electrically configured to communicate with, is electrically coupled to, etc.) the central controller 402. The injector controller 408 is configured to receive a target flow rate $F_T$ from the central controller 402 and to receive a measured pressure $P_M$ from a pump (e.g., the reductant pump 120, etc.). The measured pressure $P_M$ may be an average of a set of pressures (e.g., an average of a set of pressures obtained over an interval of time, an average of a set of a number of pressure readings, etc.). The target flow rate $F_T$ may be a mass flow rate, a volumetric flow rate, or other similar flow rates. The measured pressure $P_M$ may be a pressure of reductant entering the pump or a pressure of the reductant exiting the pump. As will be explained in more detail herein, the PID controller 406 is configured to selectively modify the target flow rate $F_T$ to obtain a compensated flow rate $F_C$. The compensated flow rate $F_C$ reflects a calculated variation in the target flow rate $F_T$ based on operation of a pump (e.g., the reductant pump 120, etc.). Once the compensated flow rate $F_C$ has been obtained, the PID controller 406 causes the pump (e.g., the reductant pump 120, etc.) to operate (e.g., to change a state of the pump, etc.) according to the compensated flow rate $F_C$ (e.g., to output reductant at the compensated flow rate $F_C$, etc.) thereby increasing the desirability of the pump.

The PID controller 406 is operable in a first state (e.g., disabled state, off state, deactivated state, etc.), where the compensated flow rate $F_C$ is equal to the target flow rate $F_T$, and a second state (e.g., enabled state, on state, activated state, etc.), where the compensated flow rate $F_C$ is a function of the target flow rate $F_T$ and an average pressure gain $P_{GAvg}$, which is a function of a pressure gain $P_G$. As will be explained in more detail herein, the pressure gain $P_G$ is determined based on operation of a pump (e.g., the reductant pump 120, etc.) and the average pressure gain $P_{GAvg}$ is determined using discrete time integration. In one example, the PID controller 406 may be in the first state such that the compensated flow rate $F_C$ is equal to the target flow rate $F_T$ upon start-up of an internal combustion engine (e.g., at the first time step, etc.) having the dosing module control system 400.

The injector controller 408 includes an injector controller processing circuit 410 which further includes an injector controller memory 412. The injector controller memory 412 includes an injector controller compensation module 414 and an injector controller correlation module 416. The injector controller compensation module 414 is configured to control the state of the PID controller 406 (e.g., modulate the PID controller 406 between the first state and the second state, etc.). The injector controller correlation module 416 is configured to correlate the target flow $F_T$ and the measured pressure $P_M$ with an injector duty cycle $d_I$. The injector duty cycle $d_I$ is a percentage of time over a target duration in which an injector (e.g., the injector 128, etc.) of the dosing module control system 400 is activated and dosing the reductant (e.g., into the exhaust gases, etc.). In an example embodiment, the injector controller correlation module 416 utilizes a lookup table or datasheet provided by a manufacturer of the pump (e.g., the reductant pump 120, etc.) to correlate the target flow $F_T$ and the measured pressure $P_M$ with an injector duty cycle $d_I$.

The PID controller 406 also includes a pressure controller 418. The pressure controller 418 is configured to receive a target pressure $P_T$ from the central controller 402 and to receive the measured pressure $P_M$ from the pump (e.g., the reductant pump 120, etc.). The target pressure $P_T$ is a target (e.g., desired, theoretical, etc.) pressure associated with the pump (e.g., the reductant pump 120, etc.). The pressure controller 418 includes a pressure controller processing circuit 420 which further includes a pressure controller memory 422. The pressure controller memory 422 includes a pressure controller target parameters module 424. The pressure controller 418 utilizes the target pressure $P_T$ to produce a pump frequency $f_P$. The pump frequency $f_P$ is a frequency at which a pump (e.g., the reductant pump 120, etc.) of the dosing module control system 400 is to operate (e.g., a number of strokes of a cylinder within the pump per second, a number of revolutions of an impeller within the pump per second, etc.).

The doser compensation system 404 also includes a pump 426 (e.g., positive displacement pump, centrifugal pump, etc.). In an example embodiment, the pump 426 may be a piston pump P1300 from Thomas Magnete GmbH. The pump 426 is part of the dosing module (e.g., the dosing module 114, etc.) that the dosing module control system 400 is implemented with. The pump 426 controls the flow of reductant from the dosing module and therefore controls the amount of reductant that is dosed into an exhaust component.

The pump 426 includes a pump processing circuit 428 and a pressure sensor 430. The pressure sensor 430 is configured to measure the pressure of the reductant provided by the pump 426 (e.g., at an outlet of the pump 426, etc.) and/or the pressure of the reductant provided to the pump 426 (e.g., at an inlet of the pump 426, etc.). The pump processing circuit 428 includes a pump memory 432 which further includes a pump control module 434. The pump 426 is configured to receive the injector duty cycle $d_I$ and pump frequency $f_P$ from the injector controller 408 and alter operation of the pump 426 accordingly. For example, as the pump frequency $f_P$ increases, the pump 426 may cause an impeller of the pump 426 to spin faster. The pump 426 is configured to provide the measured pressure $P_M$. As the injector duty cycle $d_I$ and pump frequency $f_P$ change, the measured pressure $P_M$ correspondingly changes.

The doser compensation system 404 also includes a pressure observer 436. The pressure observer includes a pressure observer processing circuit 438 which further includes a pressure observer memory 440. The pressure observer memory 440 includes a pressure observer pump analysis module 442 and a pressure observer gain analysis module 444. The pressure observer 436 is configured to receive the injector duty cycle $d_I$, the pump frequency $f_P$, and the measured pressure $P_M$, and produce the pressure gain $P_G$. The pressure observer 436 is also configured to receive an injector pulse $I_P$ from the central controller 402. The injector pulse $I_P$ is equal to one when the injector (e.g., the injector 128) is energized and zero when the injector is not energized.

Figure 5:
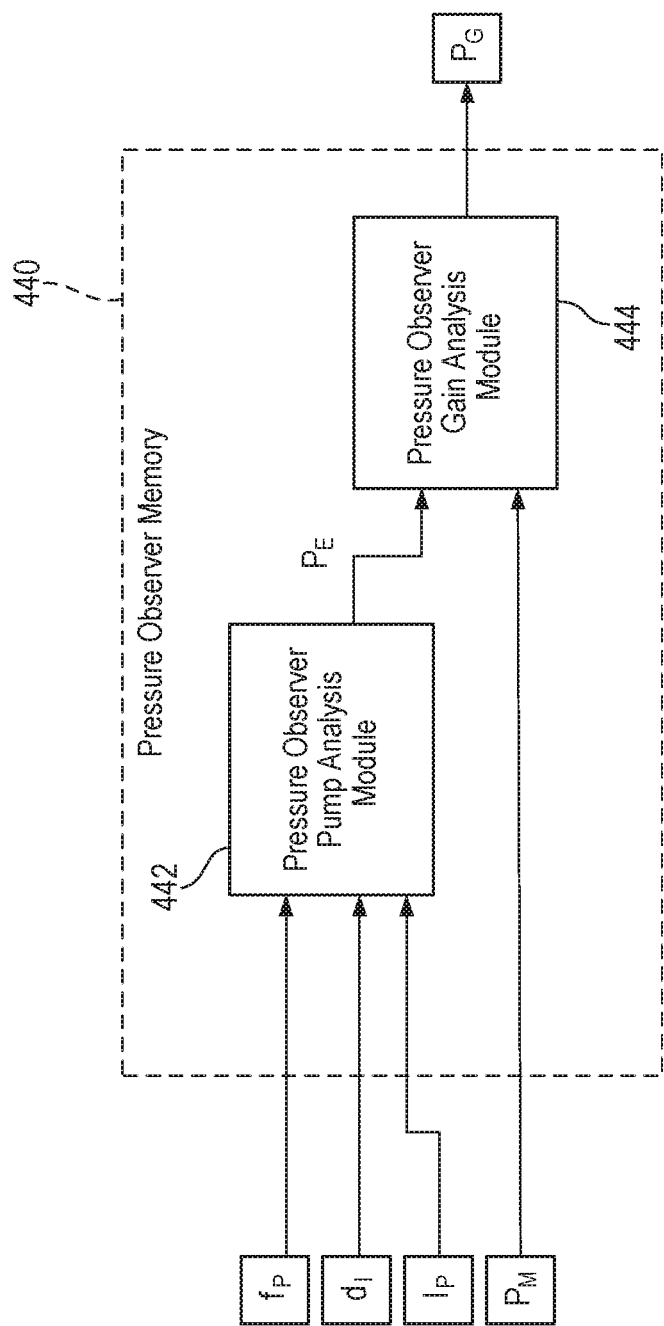
FIG. 5 is a detailed view of a portion of the example dosing module control system shown in FIG. 4.

FIG. 5 illustrates the pressure observer memory 440 in greater detail. The pressure observer pump analysis module 442 is configured to receive the pump frequency $f_P$, the injector duty cycle $d_I$, and the injector pulse $I_P$. The pressure observer pump analysis module 442 is configured to produce an estimated pressure $P_E$. The estimated pressure $P_E$ is an estimated (e.g., calculated, determined, etc.) pressure of reductant at an outlet of the pump 426 and/or at an inlet of the pump 426. The pressure observer gain analysis module 444 is configured to receive the measured pressure $P_M$ from the pump 426, receive the estimated pressure $P_E$ from the pressure observer pump analysis module 442, and produce the pressure gain $P_G$. The pressure gain $P_G$ is a dimensionless factor that represents a comparison between the measured pressure $P_M$ and the estimated pressure $P_E$.

After receiving the pump frequency $f_P$, the pressure observer pump analysis module 442 computes an adjusted pump frequency $f_{PA}$. The adjusted pump frequency $f_{PA}$ is computed by $$f_{PA} = \frac{num(f_P)}{f_P - 0.9967} \tag{14}$$

where num($f_P$) is the real component (e.g., as opposed to any imaginary component, etc.) of the pump frequency $f_P$. The adjusted pump frequency $f_{PA}$ is computed to account for variations in the pump frequency $f_P$.

After receiving the injector pulse $I_P$, the pressure observer pump analysis module 442 computes an adjusted injector pulse $I_{PA}$. The adjusted injector pulse $I_{PA}$ is computed by $$I_{PA} = \frac{num(I_P)}{I_P - 0.9967} \quad (15)$$

where num($I_P$) is the real component (e.g., as opposed to any imaginary component, etc.) of the injector pulse $I_P$. The adjusted injector pulse $I_{PA}$ is computed to account for variations in the injector pulse $I_P$.

After determining the adjusted pump frequency $f_{PA}$ and the adjusted injector pulse $I_{PA}$, the pressure observer pump analysis module 442 determines a first estimated pressure factor $P_{E1}$ using a discrete state space model $$x(n+1) = A*x(n) + B*u(n) \quad (16)$$

$$y(n) = C*x(n) + D*u(n) \quad (17)$$

where A, B, C, and D are separate matrices that are determined by a matrix tuning process implemented by the PID controller 406. To implement the matrix tuning process, the PID controller 406 sets the pump frequency $f_P$ to a constant value, such as 25 Hz or 30 Hz, and sets the injector duty cycle $d_I$ to a constant value, such as 90%. The PID controller 406 then gradually increases (e.g., steps, etc.) the pump frequency $f_P$ and records (e.g., logs, etc.) the measured pressure $P_M$. After the PID controller 406 records these measured pressures $P_M$, the PID controller 406 may generate a preliminary $4^{th}$ order system that fits (e.g., matches, corresponds with, etc.) the recorded measured pressures $P_M$. The PID controller 406 may generate the preliminary $4^{th}$ order system in canonical form. After generating the preliminary $4^{th}$ order system, the PID controller 406 utilizes the preliminary $4^{th}$ order system in a processing and equipment monitoring (PEM) function to determine a refined system that more accurately fits the data than the preliminary $4^{th}$ order system. The PID controller 406 then utilizes this refined system to determine A, B, C, and D. In an example embodiment $$A = \begin{bmatrix} 0.9703 & -0.0243 & -0.6677 \\ -0.0671 & 0.7431 & -1.997 \\ 0.04576 & 0.02095 & -0.646 \end{bmatrix} \quad (18)$$

$$B = \begin{bmatrix} -0.009421 & -0.02121 \\ -0.03859 & -0.08485 \\ -0.0228 & -0.06218 \end{bmatrix} \quad (19)$$

$$C = [\,7.312 \;\; -3.155 \;\; 0.5125\,] \quad (20)$$

$$D = [\,0 \;\; 0\,] \quad (21)$$

where $$A = \begin{bmatrix} (x(1), x(1)) & (x(1), x(2)) & (x(1), x(3)) \\ (x(2), x(1)) & (x(2), x(2)) & (x(2), x(3)) \\ (x(3), x(1)) & (x(3), x(2)) & (x(3), x(3)) \end{bmatrix} \quad (22)$$

$$B = \begin{bmatrix} (x(1), u(1)) & (x(1), u(2)) \\ (x(2), u(1)) & (x(2), u(2)) \\ (x(3), u(1)) & (x(3), u(2)) \end{bmatrix} \quad (23)$$

$$C = [\,(y(1), x(1)) \;\; (y(1), x(2)) \;\; (y(1), x(3))\,] \quad (24)$$

$$D = [\,(y(1), u(1)) \;\; (y(1), u(2))\,] \quad (25)$$

The pressure observer pump analysis module 442 also determines a second estimated pressure factor $P_{E2}$ using $$P_{E2} = K_1 + K_2 f_P + K_3 d_I + K_4 |f_P|^2 + K_5 |d_I|^2 \quad (26)$$

where $K_1$, $K_2$, $K_3$, $K_4$, and $K_5$ are constants that are determined by a constant tuning process implemented by the PID controller 406. To implement the constant tuning process, the PID controller 406 initially sets all of $K_1$, $K_2$, $K_3$, $K_4$, and $K_5$ to 0 and implements a test (e.g., design of experiment (DOE, etc.) which sets the pump frequency $f_P$ and injector duty cycle $d_I$ to various values and determines errors between measured pressures $P_M$ and pressures determined by a discrete state space model. After the errors have been determined, a nonlinear regression model of the pump frequencies $f_P$, injector duty cycles $d_I$, and the errors is fit to determine the constants $K_1$, $K_2$, $K_3$, $K_4$, and $K_5$. In an example embodiment $$\begin{bmatrix} K_1 \\ K_2 \\ K_3 \\ K_4 \\ K_5 \end{bmatrix} = \begin{bmatrix} -0.5132 \\ 0.026886 \\ -0.022815 \\ -0.010032 \\ 0.000057892 \end{bmatrix} \quad (27)$$

although other values for the constants the constants $K_1$, $K_2$, $K_3$, $K_4$, and $K_5$ are possible.

After receiving the second estimated pressure factor $P_{E2}$, the pressure observer gain analysis module 444 computes an adjusted second estimated pressure factor $P_{AE2}$. The adjusted second estimated pressure factor $P_{AE2}$ is computed by $$P_{AE2} = \frac{num(P_{E2})}{P_{E2} - 0.9967} \quad (28)$$

where num($P_{E2}$) is the real component (e.g., as opposed to any imaginary component, etc.) of the second estimated pressure factor $P_{E2}$. The adjusted second estimated pressure factor $P_{AE2}$ is computed to account for variations in the second estimated pressure factor $P_{E2}$.

Once the first estimated pressure factor $P_{E1}$ and the adjusted second estimated pressure factor $P_{AE2}$ have been determined, the pressure gain $P_G$ is determined by $$P_G = P_{E1} + P_{AE2} \quad (29)$$

Once the pressure gain $P_G$ has been computed by the pressure observer gain analysis module 444, the pressure gain $P_G$ is provided to the pressure controller 418, and the process of determining the compensated flow rate $F_C$ beings again. This operation may be run in a continuous loop such that the pump 426 continues to operate desirably. In this way, the dosing module control system 4200 may optimize operation of the pump 426 according to dimensions of a specific injector associated with the dosing module control system 400. Additionally, the dosing module control system 400 may be utilized to perform on-board or remote diagnostics. For example, the doser compensation system 404 may communicate with an external system (e.g., a laptop, a computer, a mobile phone, etc.) and transmit, for example, the measured pressure $P_M$, the pressure gain $P_G$, the injector duty cycle $d_I$, the pump frequency $f_P$, and the pressure error $E_P$ to the external system.

The central controller 402, the injector controller processing circuit 410, the pressure controller processing circuit 420, the pump processing circuit 428, and/or the pressure observer processing circuit 438 may include a microprocessor, an ASIC, a FPGA, etc., or combinations thereof. The central controller 402 may include memory, which may include, but is not limited to, electronic, optical, magnetic, or any other storage or transmission device capable of providing a processor, ASIC, FPGA, etc. with program instructions. This memory, as well as the injector controller memory 412, the pressure controller memory 422, the pump memory 432, and the pressure observer memory 440, may include a memory chip, EEPROM, EPROM, flash memory, or any other suitable memory from which the associated controller can read instructions. The instructions may include code from any suitable programming language.

The doser compensation system 404 may be located separate from the central controller 402. For example, the central controller 402 may be located proximate a front end of a vehicle (e.g., in an engine bay, in a cab, etc.) and the doser compensation system 404 may be located proximate a rear end of a vehicle (e.g., in a cargo bay, in a frame compartment, etc.).

The pressure controller 418 is configured to provide the pump frequency $f_P$ to the injector controller 408. Additionally, the injector controller 408 is configured to receive the measured pressure $P_M$ and compare the target pressure $P_T$ and the measured pressure $P_M$ to determine a pressure error $E_P$. The pressure controller 418 is also configured to provide the pressure error $E_P$ to the injector controller 408.

The PID controller 406 is configured to switch between the first state, where the compensated flow rate $F_C$ is equal to the target flow rate $F_T$, and the second state, where the compensated flow rate $F_C$ is a function of the target flow rate $F_T$ and an average pressure gain $P_{GAvg}$, which is a function of a pressure gain $P_G$. In an example embodiment, the PID controller 406 is configured to operate in the first state when an internal combustion engine associated with the dosing module control system 400 is not powered and when the internal combustion engine is operating at conditions other than steady-state (e.g., warm up, cool down, etc.). In this embodiment, the PID controller 406 is configured to operate in the second state when the internal combustion engine is operating at steady-state and has been operating at steady state for an amount of time t greater than a target amount of time $t_{Target}$ (e.g., 20 seconds, 20 minutes, etc.). In this way, the target amount of time $t_{Target}$ functions like a threshold. In an example embodiment, the target amount of time $t_{Target}$ is 20 seconds.

The PID controller 406 may determine if the internal combustion engine is operating at steady-state by comparing a parameter to maximum and minimum values for that parameter, the maximum and minimum values defining a range of the parameter associated with operation of the internal combustion engine at steady state. In various embodiments, these parameters are the injector duty cycle $d_I$, the pump frequency $f_P$, and the pressure error $E_P$. Accordingly, the PID controller 406 may utilize any combination of the comparisons $$d_{IMin} < d_I < d_{IMax} \tag{30}$$

$$f_{PMin} < f_P < f_{PMax} \tag{31}$$

$$E_{PMin} < E_P < E_{PMax} \tag{32}$$

to determine if the internal combustion engine is operating at steady state. Specifically, the PID controller 406 may determine that the internal combustion engine is operating at steady state if: the injector duty cycle $d_I$ is greater than a minimum injector duty cycle $d_{IMin}$ and less than a maximum injector duty cycle $d_{IMax}$; the pump frequency $f_P$ is greater than a minimum pump frequency $f_{PMin}$ and less than a maximum pump frequency $f_{PMax}$; and/or the pressure error $E_P$ is greater than a minimum pressure error $E_{PMin}$ and less than a maximum pressure error $E_{PMax}$. The PID controller 406 may perform these comparisons continuously (e.g., at each time step, etc.). For example, the PID controller 406 may perform these comparisons continuously while the internal combustion engine is operational and not perform these comparisons while the internal combustion engine is not operational.

As previously mentioned, the compensated flow rate $F_C$ is a function of the average pressure gain $P_{GAvg}$. The average pressure gain $P_{GAvg}$ is determined continuously once the PID controller 406 has been in the second state for an amount of time t greater than the target amount of time $t_{Target}$. For example, so long as the injector duty cycle $d_I$ is greater than the minimum injector duty cycle $d_{IMin}$ and less than the maximum injector duty cycle $d_{IMax}$, and the amount of time t is greater than the target amount of time $t_{Target}$, the average pressure gain $P_{GAvg}$ may be determined. Once the PID controller 406 switches from the second state back to the first state, the amount of time t is reset back to 0 but will restart (e.g., count from 0 upwards) once the PID controller 406 is in the second state again. In this way, the amount of time t may be thought of as recording an amount of time that the PID controller 406 has been in the second state at the present instance of the PID controller 406 being in the second state (e.g., rather than a total amount of time that the PID controller 406 has been in the second state without regard to whether or not the PID controller 406 has been in the first state since initially entering the second state, etc.).

The amount of time t is a discrete output from a discrete time integration, using a unit delay, of an actual amount of time $t_{Actual}$ that the PID controller 406 has been in the second state. Like the amount of time t, the actual amount of time $t_{Actual}$ is also reset back to 0 when the PID controller 406 enters the first state, but will restart once the PID controller 406 enters the second state. The unit delay is equal to the amount of time t at one time step prior (e.g., n−1, etc.) to the time step (e.g., n, etc.) at which the actual amount of time $t_{Actual}$ is determined, where the amount of time t is greater than the target amount of time $t_{Target}$.

To determine the average pressure gain $P_{GAvg}$, the pressure gain $P_G$ is first passed through a discrete time integration using the unit delay. The pressure gain $P_G$ is then divided by the amount of time t, without regard as to the target amount of time $t_{Target}$, to determine the average pressure gain $P_{GAvg}$. However, the PID controller 406 only utilizes the average pressure gain $P_{GAvg}$ in computing the compensated flow rate $F_C$ if the amount of time t is greater than the target amount of time $t_{Target}$.

V. Construction of Example Embodiments

While the dosing module control system 200 is shown and described as including the flow observer 236, it is understood that the dosing module control system 200 may additionally or alternative include the pressure observer 436 and the injector controller 408. In these embodiments, the dosing module control system 200 may determine the compensated flow $F_C$ according to the average pressure gain $P_{GAvg}$ and/or the average flow rate gain $F_{GAvg}$.

While the dosing module control system 400 is shown and described as including the pressure observer 436, it is understood that the dosing module control system 400 may additionally or alternative include the flow controller 208, the driver 225, and the flow observer 236. In these embodiments, the dosing module control system 400 may determine the compensated flow $F_C$ according to the average pressure gain $P_{GAvg}$ and/or the average flow rate gain $F_{GAvg}$.

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled to," "fluidly configured to communicate with," and the like, as used herein, mean the two components or objects have a pathway formed between the two components or objects in which a fluid, such as air, liquid reductant, gaseous reductant, aqueous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language "a portion" is used, the item can include a portion and/or the entire item unless specifically stated to the contrary.

What is claimed is:

1. A dosing module control system comprising:
   a central controller configured to obtain a target flow rate and a target pressure;
   a flow observer configured to determine a flow rate gain;
   a switching doser controller configured to communicate with the central controller and the flow observer and configured to:
   receive the target flow rate and the target pressure from the central controller,
   receive the flow rate gain from the flow observer,
   determine a compensated flow rate based on the target flow rate, the target pressure, and the flow rate gain, and
   determine at least one of an injector duty cycle associated with the determined compensated flow rate, or a pump frequency associated with the determined compensated flow rate; and
   a pump configured to communicate with the switching doser controller, the pump configured to receive the at least one of the injector duty cycle or the pump frequency from the switching doser controller and to operate based on the at least one of the determined injector duty cycle or the determined pump frequency to provide reductant at the compensated flow rate.

2. The dosing module control system of claim 1, wherein:
   the pump is configured to communicate with the flow observer;
   the pump comprises a pressure sensor configured to determine a measured pressure associated with the reductant in the pump; and
   the flow observer is configured to receive the measured pressure from the pump.

3. The dosing module control system of claim 2, wherein:
   the flow observer is configured to receive the at least one of the injector duty cycle or the pump frequency from the switching doser controller; and
   the flow observer is configured to determine the flow rate gain based on the at least one of the injector duty cycle or the pump frequency from the switching doser controller and the measured pressure.

4. The dosing module control system of claim 2, wherein:
   the switching doser controller is configured to receive the measured pressure from the pump; and
   the switching doser controller is configured to determine a pressure error by comparing the measured pressure to the target pressure.

5. The dosing module control system of claim 4, wherein:
   the switching doser controller is operable between a first state and a second state;
   the switching doser controller is configured to set the compensated flow rate equal to the target flow rate in the first state; and
   the switching doser controller is configured to cause the compensated flow rate to be other than the target flow rate in the second state.

6. The dosing module control system of claim 5, wherein:
   the switching doser controller is configured to compare the pressure error to a minimum pressure error and a maximum pressure error;

the switching doser controller is caused to be in the first state in response to the pressure error being less than or equal to the minimum pressure error or greater than or equal to the maximum pressure error; and the switching doser controller is caused to be in the second state in response to the pressure error being greater than the minimum pressure error and less than the maximum pressure error.

7. The dosing module control system of claim 1, wherein the at least one of the injector duty cycle or the pump frequency is both the injector duty cycle and the pump frequency.

8. The dosing module control system of claim 1, wherein:
the switching doser controller is operable between a first state and a second state;
the switching doser controller is configured to set the compensated flow rate equal to the target flow rate in the first state; and
the switching doser controller is configured to cause the compensated flow rate to be other than the target flow rate in the second state.

9. The dosing module control system of claim 8, wherein:
the at least one of the injector duty cycle or the pump frequency is at least the injector duty cycle;
the switching doser controller is configured to compare the injector duty cycle to a minimum injector duty cycle and a maximum injector duty cycle;
the switching doser controller is caused to be in the first state in response to the injector duty cycle being less than or equal to the minimum injector duty cycle or greater than or equal to the maximum injector duty cycle; and
the switching doser controller is caused to be in the second state in response to the injector duty cycle being greater than the minimum injector duty cycle and less than the maximum injector duty cycle.

10. The dosing module control system of claim 8, wherein:
the at least one of the injector duty cycle or the pump frequency is at least the pump frequency;
the switching doser controller is configured to compare the pump frequency to a minimum pump frequency and a maximum pump frequency;
the switching doser controller is caused to be in the first state in response to the pump frequency being less than or equal to the minimum pump frequency or greater than or equal to the maximum pump frequency; and
the switching doser controller is caused to be in the second state in response to the pump frequency being greater than the minimum pump frequency and less than the maximum pump frequency.

11. A dosing module control system comprising:
a central controller configured to obtain a target flow rate and a target pressure;
a pressure observer configured to determine a pressure gain;
a proportional-integral-derivative (PID) controller configured to communicate with the central controller and the pressure observer and configured to:
receive the target flow rate and the target pressure from the central controller,
receive the pressure gain from the pressure observer,
determine a compensated flow rate based on the target flow rate, the target pressure, and the pressure gain, and
determine at least one of an injector duty cycle associated with the compensated flow rate, or a pump frequency associated with the compensated flow rate; and
a pump configured to communicate with the PID controller, the pump configured to receive the at least one of the injector duty cycle or the pump frequency from the PID controller and to operate based on the at least one of the injector duty cycle or the pump frequency to provide reductant at the compensated flow rate.

12. The dosing module control system of claim 11, wherein:
the pump is configured to communicate with the pressure observer;
the pump comprises a pressure sensor configured to determine a measured pressure associated with the reductant in the pump; and
the pressure observer is configured to receive the measured pressure from the pump.

13. The dosing module control system of claim 12, wherein:
the pressure observer is configured to receive the at least one of the injector duty cycle or the pump frequency from the PID controller; and
the pressure observer is configured to determine the pressure gain based on the at least one of the injector duty cycle or the pump frequency from the PID controller and the measured pressure.

14. The dosing module control system of claim 12, wherein:
the PID controller is configured to receive the measured pressure from the pump; and
the PID controller is configured to determine a pressure error by comparing the measured pressure to the target pressure.

15. The dosing module control system of claim 14, wherein:
the PID controller is operable between a first state and a second state;
the PID controller is configured to set the compensated flow rate equal to the target flow rate in the first state; and
the PID controller is configured to cause the compensated flow rate to be other than the target flow rate in the second state.

16. The dosing module control system of claim 15, wherein:
the PID controller is configured to compare the pressure error to a minimum pressure error and a maximum pressure error;
the PID controller is caused to be in the first state in response to the pressure error being less than or equal to the minimum pressure error or greater than or equal to the maximum pressure error; and
the PID controller is caused to be in the second state in response to the pressure error being greater than the minimum pressure error and less than the maximum pressure error.

17. The dosing module control system of claim 11, wherein the at least one of the injector duty cycle or the pump frequency is both the injector duty cycle and the pump frequency.

18. The dosing module control system of claim 11, wherein:
the PID controller is operable between a first state and a second state;

the PID controller is configured to set the compensated flow rate equal to the target flow rate in the first state; and the PID controller is configured to cause the compensated flow rate to be other than the target flow rate in the second state.

19. The dosing module control system of claim 18, wherein:

the at least one of the injector duty cycle or the pump frequency is at least the injector duty cycle;

the PID controller is configured to compare the injector duty cycle to a minimum injector duty cycle and a maximum injector duty cycle;

the PID controller is caused to be in the first state in response to the injector duty cycle being less than or equal to the minimum injector duty cycle or greater than or equal to the maximum injector duty cycle; and the PID controller is caused to be in the second state in response to the injector duty cycle being greater than the minimum injector duty cycle and less than the maximum injector duty cycle.

20. The dosing module control system of claim 18, wherein:

the at least one of the injector duty cycle or the pump frequency is at least the pump frequency;

the PID controller is configured to compare the pump frequency to a minimum pump frequency and a maximum pump frequency;

the PID controller is caused to be in the first state in response to the pump frequency being less than or equal to the minimum pump frequency or greater than or equal to the maximum pump frequency; and the PID controller is caused to be in the second state in response to the pump frequency being greater than the minimum pump frequency and less than the maximum pump frequency.

* * * * *